United States Patent [19]

McCormick

[11] Patent Number: 4,630,719
[45] Date of Patent: Dec. 23, 1986

[54] TORQUE AIDED PULSED IMPACT SHIFT MECHANISM

[75] Inventor: Daniel F. McCormick, Oshkosh, Wis.

[73] Assignee: Brunswick Corporation, Skokie, Ill.

[21] Appl. No.: 765,326

[22] Filed: Aug. 13, 1985

[51] Int. Cl.⁴ .................... F16D 11/08; F16D 23/12
[52] U.S. Cl. .................... 192/21; 192/48.91; 192/51; 192/93 R; 74/99 A; 74/378
[58] Field of Search .............. 192/21, 51, 48.91, 93 R; 74/337.5, 378, 99 A

[56] References Cited

U.S. PATENT DOCUMENTS 4,223,773 9/1980 Croisant et al. ............. 192/93 R X
4,244,454 1/1981 Bankstahl ..................... 192/21
4,257,506 3/1981 Bankstahl ..................... 192/21

FOREIGN PATENT DOCUMENTS 765574 9/1980 U.S.S.R. .................... 74/378

Primary Examiner—Rodney H. Bonck
Assistant Examiner—Alan G. Towner
Attorney, Agent, or Firm—Andrus, Sceales, Starke & Sawall

[57] ABSTRACT

A cone clutch sleeve (18) on a main shaft (15) is moved axially between forward and reverse counter-rotating gears (13 and 14) by a yoke (102) having mirror-image oppositely tapered cams (108 and 109) on opposite sides thereof which are selectively rotatable to engage eccentric rings (132 and 133) on the forward and reverse gears. This engagement drives the yoke away from the one engaged gear and toward the other gear to in turn drive the clutch sleeve out of engagement with the one gear such that torque applied through the cam-engaged gear ring assists clutch disengagement of the one gear such that requisite shift force decreases as speed and torque increases. The eccentric face surface of each ring actuates the yoke and drives the sleeve member out of engagement with the one gear and into engagement with the other gear with a pulsed impact hammer effect due to the eccentricity of the face surface as it rotates in a circumferential plane about the main shaft.

18 Claims, 8 Drawing Figures

TORQUE AIDED PULSED IMPACT SHIFT MECHANISM

BACKGROUND AND SUMMARY

The invention relates to a gear shifting mechanism and clutch apparatus. The invention is particularly useful in marine drives of the type having an axially movable central clutch sleeve element supported for rotation with a main shaft and positioned between forward and reverse gears each having a clutch face, for example as shown in Bankstahl U.S. Pat. Nos. 4,244,454 and 4,257,506.

The present invention addresses shifting problems, particularly at increased RPM. Prior shifting mechanisms required increased shifting forces as RPM increases.

The present invention uses engine drive torque to assist in shifting and clutch disengagement such that the requisite shifting force decreases as torque increases.

The invention further uses drive torque to provide a pulsed rotary impact hammer effect further aiding clutch disengagement.

DETAILED DESCRIPTION

Figure 1:
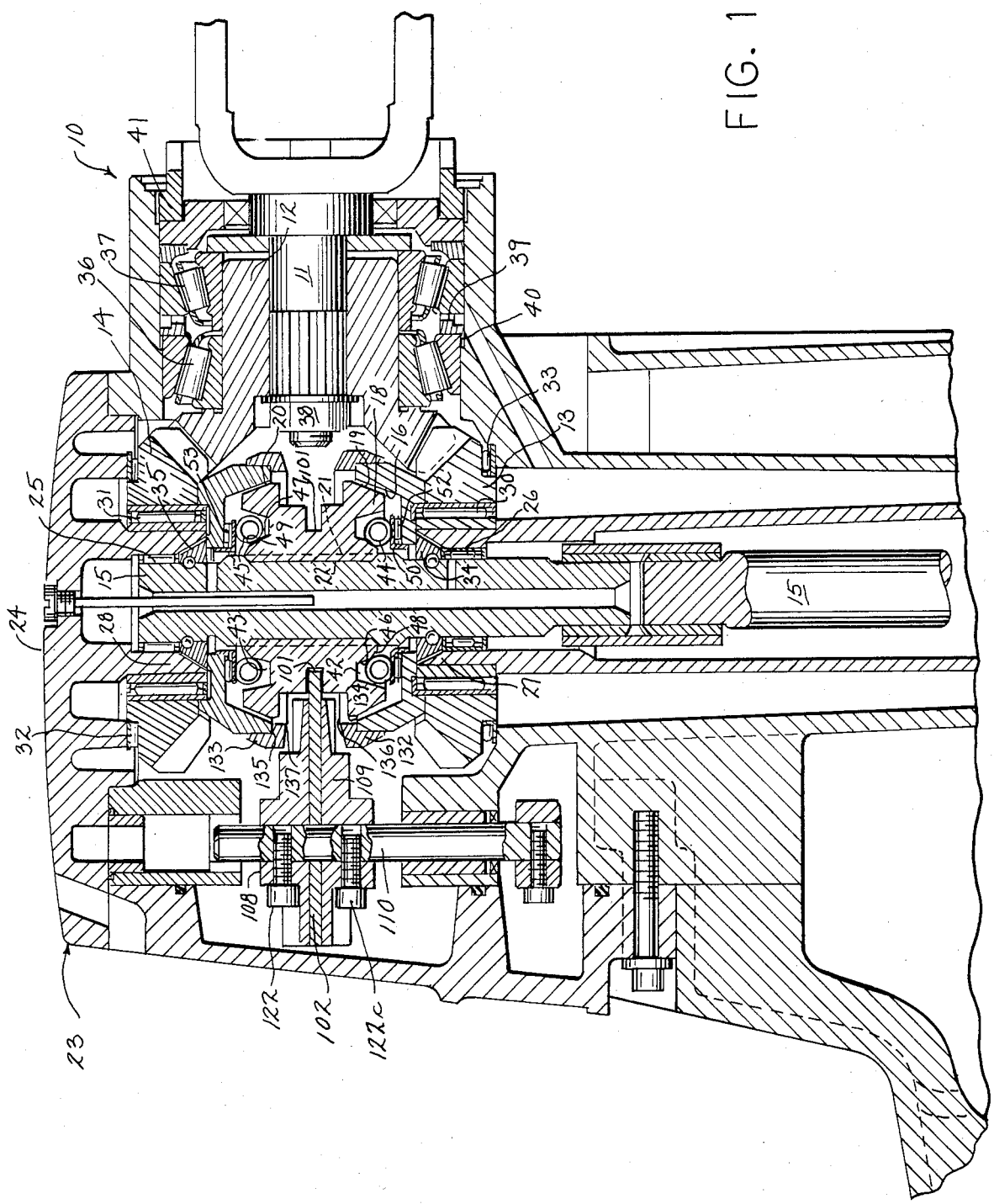
FIG. 1 is a side view in section of the upper portion of a marine stern drive showing the shifting mechanism and clutch apparatus in accordance with the invention.

FIG. 1 shows the upper portion of a marine stern drive unit 10, for which further reference may be had to the above noted U.S. Pat. Nos. 4,244,454 and 4,257,506 incorporated herein by reference. The structure in FIG. 1 which is common with these references will be only briefly described, and like reference numerals are used where appropriate to facilitate clarity. As is well known in such arrangements, an input shaft 11 carries an input bevel gear 12 which drives the counter rotating forward bevel gear 13 and reverse bevel gear 14 which rotate about axial main shaft 15. The forward and reverse gears 13 and 14 each have an internal conical clutch surface 16, 17, attached by welding, facing each other. The main shaft 15 carries a sleeve member 18 between the clutch gears 13 and 14, the sleeve member 18 having conical clutch faces 19 and 20 on each end for mating with the forward and reverse gears. The sleeve member 18 has internal helical splines 21 engaged with helical splines 22 on main shaft 15. When clutch sleeve 18 is engaged with either the forward or reverse gear 13 or 14, the helical splines 21 and 22 act to force the engaged clutch faces toward each other, thereby driving main shaft 15 in either forward or reverse. The main shaft 15 extends downwardly to drive a propeller, not shown.

Top cover 24 is attached to gear housing 23 by machine screws, not shown. Main shaft 15 is supported for rotation by the upper and lower main needle bearings 25 and 26 which are mounted on the inside of annular projections 27 and 28 extending from the top cover 24 and the lower housing, respectively. Mounted on the outside of the annular projections 27 and 28, in substantially the same plane as the main bearings and the gear teeth, are the forward and reverse gear needle bearings 30 and 31 which carry the forward and reverse clutch gears 13 and 14. Thrust bearings 32 and 33 are mounted on the housing to position the forward and reverse gears 13 and 14 and support the axial loads thereon. Thrust collars 34 and 35, fixed to main shaft 15, bear against outside surfaces of the forward and reverse gears 13 and 14. Input gear 12 is supported by bearings 36 and 37 which are axially loaded by nut 38 which attaches input shaft 11 to input gear 12. Between the bearings 36 and 37 is a collar 39 which serves to axially position the assembly against a surface 40 machined on gear housing 23. Threaded collar 41 forces collar 39 against the housing 23. Because the housing surfaces on which the bearings rest can be accurately machined, precise location of the forward and reverse gears 13 and 14 relative to the input bevel gear 12 is assured. This arrangement substantially eliminates forces that would tend to misalign the clutch faces, accurately positions the gears, thereby extending the useful life of the unit, and simplifies assembly of the drive unit components.

To provide a smooth, uniform shifting action, the clutch sleeve 18 has grooves 42 and 43 on each end with coil springs 44 and 45, acting as garter springs, placed in tension encircling the main shaft 15, within each groove 42 and 43. Each groove 42 and 43 has two cam surfaces on which the coil springs are supported. The axially inward cam surfaces 46 and 47 are sloped at twenty degrees to the axis of the main shaft, while the axially outward cam surfaces 48 and 49 are sloped at forty-five degrees. As a result, the coil springs 44 and 45 are always biased axially outward from the end grooves 42 and 43 to push against thrust plates 50 and 51 which in turn ride on bearings 52 and 53 which bear against forward and reverse gears 13 and 14. The intersections of the forty-five degree and twenty degree cam faces are placed to locate the coil springs 44 and 45 very nearly on the intersections when the clutch sleeve 18 is in the neutral position, half way between the forward and reverse gears 13 and 14.

When the clutch sleeve 18 is moved away from its neutral position, say toward the forward gear 13, one spring 45 will ride down onto its forty-five degree cam face 49 while the other spring 44 will ride up onto its twenty degree cam face 46. As a result, the axial force produced by the one spring 45 will increase and the other will decrease, producing a net force to push the clutch sleeve 18 into engagement with the forward gear 13. The spring 44 riding on the twenty degree cam face 46 will act to provide a minimum axial load on the forward gear's thrust plate 50 while the spring 45 will provide an axial load to hold gear 14 in place. Thus a smooth, uniform shifting action will result, since substantially the same force will be applied to the clutch sleeve 18 every time it is shifted. Shifting to reverse is of course the converse of shifting to forward.

The structure described thus far is identical to that shown in the above noted Bankstahl U.S. Pat. Nos. 4,244,454 and 4,257,506.

Figure 2:
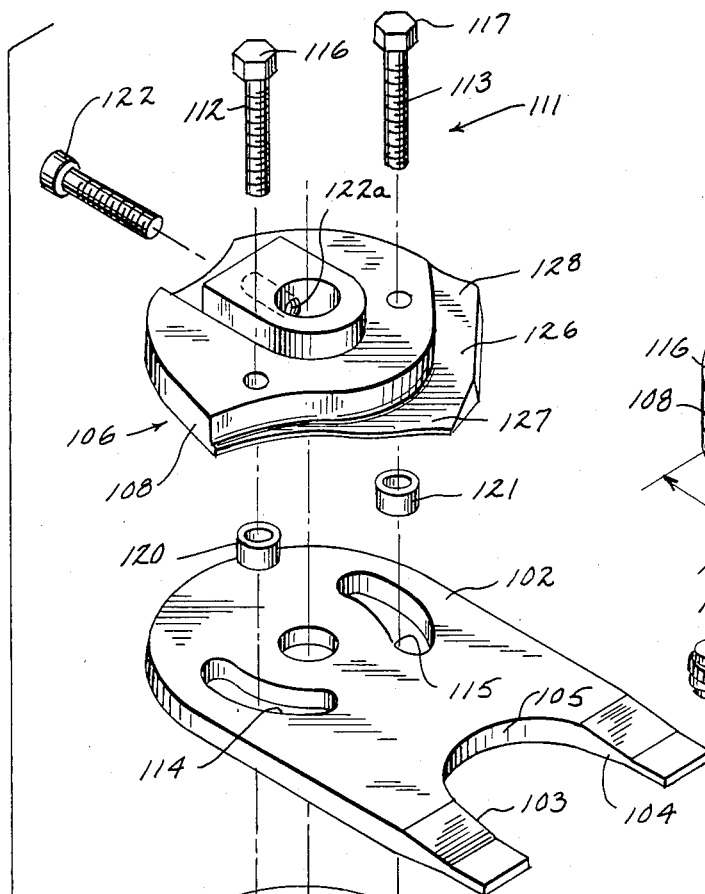
FIG. 2 is an exploded isometric view of a portion of FIG. 1.
Figure 3:
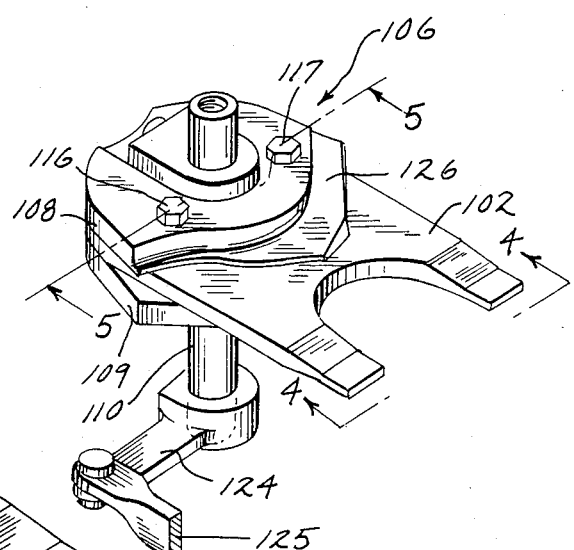
FIG. 3 is an assembled isometric view of the structure in FIG. 2.

Referring to FIGS. 1-3, clutch sleeve 18 has an exterior circumferential groove 101 axially between its conical clutch faces 19 and 20. A yoke 102 engages groove 101 for moving sleeve member 18 axially along shaft 15. Yoke 102, FIGS. 2 and 3, is a split fork with tines 103 and 104 and central portion 105 engaging groove 101. Cam means 106 is operatively associated with yoke 102, and actuating means 107 is provided for actuating cam means 106 into engagement with one of the forward or reverse gears 13 and 14 to actuate yoke 102 and drive sleeve member 18 into engagement with the other of the forward and reverse gears.

Cam means 106 comprises first and second cams 108 and 109 on opposite sides of yoke 102. First cam 108 faces reverse gear 14 thereabove. Second cam 109 faces forward gear 13 therebelow. Actuating means 107 comprises an axial shaft 110 parallel to main shaft 15 for rotating cams 108 and 109 relative to yoke 102 about an axis parallel to main shaft 15. Interconnection means 111 is provided for interconnecting cams 108 and 109 to each other to rotate in unison relative to yoke 102.

Interconnection means 111 includes attachment means such as axial bolts 112 and 113 extending through apertures 114 and 115 in yoke 102 and connected to each of cams 108 and 109, such as at enlarged heads 116 and 117 and nuts 118 and 119. Annular spacer sleeves 120 and 121 are provided around bolts 112 and 113 and extend through respective apertures 114 and 115 in yoke 102 and engage cams 108 and 109 at the axial ends of sleeves 120 and 121. Spacer sleeves 120 and 121 have a height or thickness slightly greater than the thickness of yoke 102 in order to space first and second cams 108 and 109 apart by a distance slightly greater than the thickness of yoke 102, which allows the first and second cams to rotate in unison relative to yoke 102 with minimal frictional retardation. Cam 108 is mounted to actuating rotary shaft 110 by set screw 122 extending through aperture 122a in cam 108 and received in threaded aperture 122b in shaft 110. A set screw may be provided for either or both of cams 108 and 109, for example as shown in FIG. 1 at 122 and 122c, though only a single set screw is needed because the cams are locked together by bolts 112 and 113 and rotate in unison.

Apertures 114 and 115 have an arcuate configuration defining an arc about a center at rotary shaft 110 through aperture 123 of the yoke. First and second cams 108 and 109 may thus rotate about the axis of shaft 110, without rotation of yoke 102 which remains in groove 101 of sleeve member 18. Rotary axial shaft 110 is operated through a lever arm 124 and linkage 125, and has a central neutral position and forward and reverse rotated positions on opposite sides of the neutral position. In the orientation in FIG. 2, clockwise rotation of shaft 110 provides the forward position, and counterclockwise rotation of shaft 110 provides the reverse position.

Figure 4:
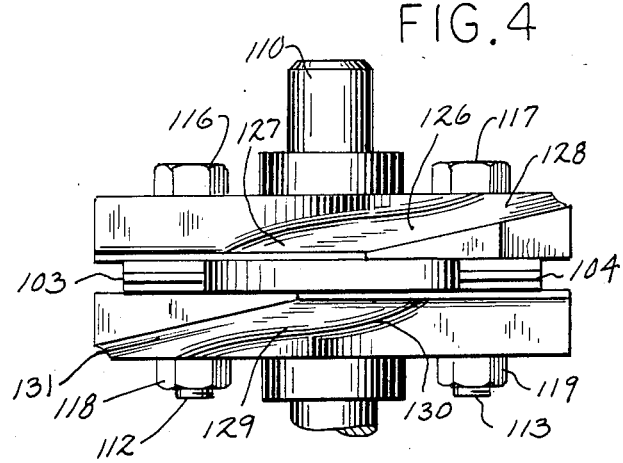
FIG. 4 is an end elevation view taken along line 4—4 of FIG. 3.
Figure 5:
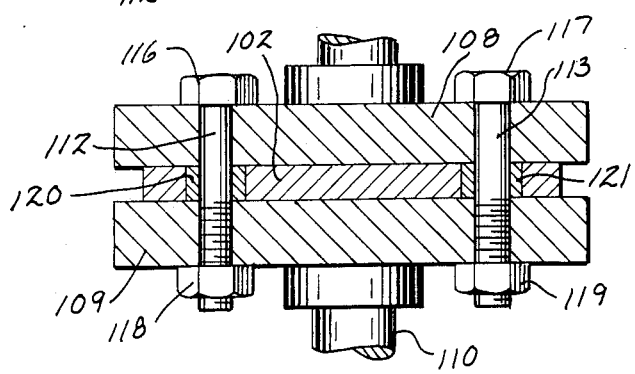
FIG. 5 is a sectional view taken along line 5—5 of FIG. 3.

Cam 108 has an arcuate tapered camming surface 126 having a reduced height portion 127 axially aligned with and spaced from reverse gear 14 thereabove when actuating means 107 is in the neutral position, and having an increased height portion 128 axially aligned with and engaging the reverse gear thereabove when actuating means 107 is rotated to the forward position, such that engagement of camming surface 126 of cam 108 with the reverse gear drives yoke 102 axially downwardly away from the reverse gear 14 and toward forward gear 13 to drive sleeve member 18 into engagement with the forward gear at conical clutch faces 19 and 16. Second cam 109 has a tapered arcuate camming surface 129, FIG. 4, having a reduced height portion 130 axially aligned with and spaced from the forward gear 13 therebelow when actuating means 107 is in the neutral position, and having an increased height portion 131 axially aligned with and engaging forward gear 13 when actuating means 107 is rotated to the reverse position, such that engagement of camming surface 129 of cam 109 with the forward gear drives yoke 102 axially upwardly away from the forward gear and toward the reverse gear 14 to drive sleeve member 18 into engagement with reverse gear 14 at conical clutch faces 20 and 17. Camming surfaces 126 and 129 of first and second cams 108 and 109 are oppositely tapered, with axially aligned reduced height portions 127 and 130, and offset increased height portions 128 and 131. Engagement of the respective tapered camming surfaces with the respective gear drives sleeve member 18 out of engagement with that gear such that torque applied to the cams 108 or 109 through the forward or reverse gear assists clutch disengagement of that gear such that requisite shift force decreases as torque increases.

In the preferred embodiment, the forward and reverse gears 13 and 14 include respective first and second annular rings 132 and 133 around facing circumferential edges 134 and 135 of the forward and reverse gears. In one form, brass rings 132 and 133 are pressfit onto the facing peripheral edges of the noted gears. The rings lie in a circumferential plane about main axial shaft 15. Each ring has an eccentric face surface 136 and 137 lying in the noted circumferential plane. Shift means, as above described, is provided by yoke 102, cams 108 and 109 and actuating means 107. Camming surface 126 of cam 108 is rotated into engagement with eccentric face surface 137 of ring 133 to actuate yoke 102 and drive sleeve member 18 axially downwardly out of engagement with reverse gear 14 and into engagement with forward gear 13 with a pulsed impact hammer effect due to the eccentricity of face surface 137 of ring 133 as it rotates in the noted circumferential plane about main shaft 15. The pulsed hammer effect disengagement of sleeve clutch 18 from reverse gear 14 further facilitates ease of shifting disengagement, in addition to the noted torque aided disengagement, such that the requisite disengagement shift force further decreases as engine speed and torque increases. In the other direction, camming surface 129 of cam 109 is rotated into engagement with eccentric face surface 136 of ring 132 to actuate yoke 102 and drive sleeve member 18 axially upwardly out of engagement with forward gear 13 and into engagement with reverse gear 14 with a pulsed impact hammer effect due to the eccentricity of face surface 136 of ring 132 as it rotates in the noted circumferential plane about main about main shaft 15. The pulsed hammer effect disengagement of sleeve clutch 18 from forward gear 13 further facilitates ease of shifting disengagement, in addition to the noted torque aided disengagement, such that the requisite disengagement shift force further decreases as engine speed and torque increases. Each of the eccentric face surfaces 136 and 137 is preferably machined to have a maximum height portion 180° offset from a minimum height portion to provide one impact on the respective cam per revolution of the respective gear means. In the preferred embodiment, the eccentric height differential of the annular circumferential surface is 0.026 inch.

Figure 6:
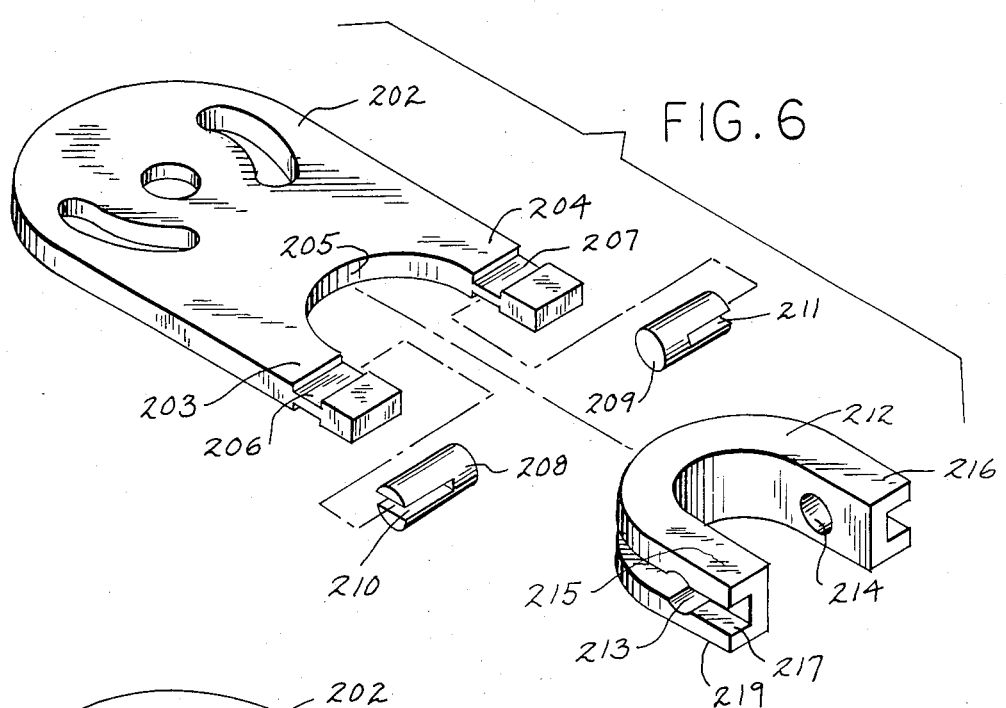
FIG. 6 is an exploded isometric view similar to FIG. 2 and shows an alternate embodiment.
Figure 7:
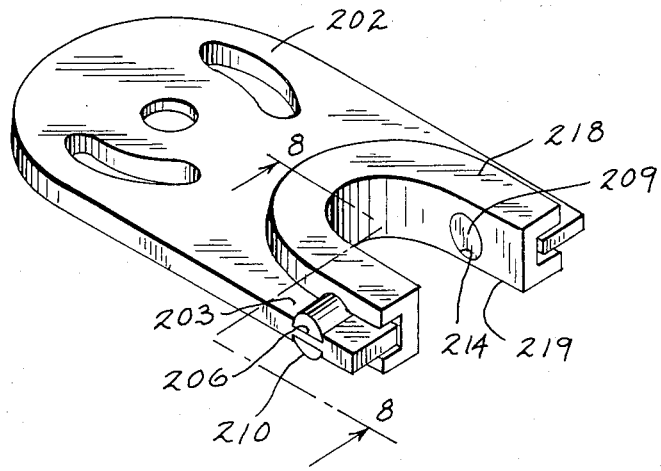
FIG. 7 is an assembled isometric view of the structure of FIG. 6.
Figure 8:
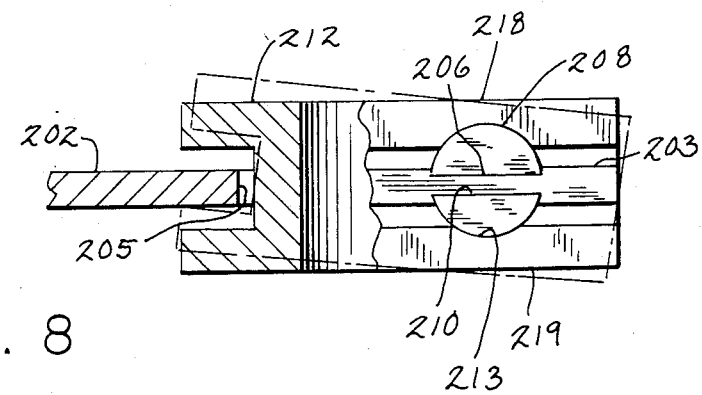
FIG. 8 is a sectional view taken along line 8—8 of FIG. 7.

In the embodiment in FIG. 6, yoke 202 is similar to yoke 102 and is a split fork with tines 203 and 204 and central portion 205. Tines 203 and 204 are notched to reduced thicknesses at 206 and 207 and receive respective trunions 208 and 209 at slots 210 and 211 therein. A U-shaped insert 212 is mounted on trunions 208 and 209 between tines 203 and 204. The insert has apertures 213 and 214 in its legs 215 and 216 for receiving trunions 208 and 209. Insert 212 has a peripheral groove 217 extending around its exterior for receiving the inner edges of tines 203 and 204 and central portion 205 of yoke 202, FIG. 7. The upper surface 218 of insert 212 engages the upper surface of circumferential groove 101 of clutch sleeve 18, and the lower surface 219 of insert 212 engages the lower surface of circumferential groove 101 of clutch sleeve 18. During such engagement, insert 212 may rock slightly about the pivot axis provided by trunions 208 and 209, as seen in FIG. 8.

It is recognized that various alternatives and modifications are possible within the scope of the appended claims.

I claim:

1. A shift mechanism and clutch apparatus comprising:
   a main axial shaft;
   reverse gear means freely rotatable about said main shaft, said reverse gear means having a clutch face on one side;
   forward gear means freely rotatable about said main shaft, said forward gear means having a clutch face on one side, with said clutch faces facing each other;
   a drive gear meshed with said reverse and forward gear means for driving said reverse and forward gear means in respectively opposite directions of rota- tion;
   a sleeve member mounted on said main shaft between said reverse and forward gear means, said sleeve member having
      a clutch face at each end, each clutch face selectively engageable with one of said clutch faces of said reverse and forward gear means, and
      an exterior circumferential groove in said sleeve member between said clutch faces; yoke means for engaging said groove and moving said sleeve member axially;
   cam means operatively associated with said yoke means; and
   actuating means for actuating said cam means into engagement with one of said gear means to actuate said yoke means and drive said sleeve member out of engagement with said one gear means and into engagement with the other of said gear means.

2. The invention according to claim 1 wherein engagement of said cam means with said one gear means drives said yoke means away from said one gear means and toward said other gear means to in turn drive said sleeve member into engagement with said other gear means, such that torque applied through said one gear means assists clutch disengagement of said one gear means such that requisite shift force decreases as speed and torque increases.

3. The invention according to claim 2 wherein said cam means comprises first and second cams on opposite sides of said yoke means, said first cam facing said reverse gear means, and said second cam facing said forward gear means.

4. The invention according to claim 3 wherein said actuating means comprises means for rotating said first and second cams relative to said yoke means about an axis parallel to said axial main shaft.

5. The invention according to claim 4 comprising means interconnecting said first and second cams to each other to rotate in unison relative to said yoke means,
   said actuating means having a central neutral position and forward and reverse rotated positions on opposite sides of said neutral position,
   said first cam means has a tapered camming surface having a reduced height portion axially aligned with and spaced from said reverse gear means when said actuating means is in said neutral position, and having an increased height portion axially aligned with and engaging said reverse gear means when said actuating means is rotated to said forward position such that engagement of said first cam means with said reverse gear means drives said yoke means axially away from said reverse gear means and toward said forward gear means to drive said sleeve member out of engagement with said reverse gear means and into engagement with said forward gear means,
   said second cam means has a tapered camming surface having a reduced height portion axially aligned with and spaced from said forward gear means when said actutating means is in said neutral position, and having an increased height portion axially aligned with and engaging said forward gear means when said actuating means is rotated to said reverse position such that engagement of said second cam means with said forward gear means drives said yoke means axially away from said forward gear means and toward said reverse gear means to drive said sleeve member out of engagement with said forward gear means and into engagement with said reverse gear means.

6. The invention according to claim 5 wherein said first and second cams have oppositely tapered said camming surfaces on opposite sides of said yoke means with axially aligned said reduced height portions and offset said increased height portions.

7. The invention according to claim 5 wherein:
   said interconnection means comprises attachment means extending through said yoke means and connected to each of said first and second cams, and spacer means associated with said attachment means and extending through said yoke means and having a thickness slightly greater than said yoke means and engaging said first and second cams to space said first and second cams apart by a distance slightly greater than said yoke means thickness.

8. The invention according to claim 7 wherein:
   said actuating means comprises an axial shaft parallel to said main shaft and extending through aligned aperture means in said yoke means and said first and second cams;
   said attachment means comprises axial bolt means extending through second aperture means in said yoke means;
   said spacer means comprises annular spacer sleeve means around said bolt means and extending through said second aperture means in said yoke means and engaging said first and second cams at the axial ends of said annular spacer sleeve means; and said second aperture means in said yoke means has an arcuate configuration defining an arc about a center at said axial actuating shaft in said first mentioned aperture means.

9. The invention according to claim 1 wherein said yoke means comprises a split fork having a pair of spaced tines engaging said groove.

10. The invention according to claim 9 comprising a pair of trunions mounted on respective said tines, and a U-shaped insert mounted on said trunions between said tines and engaging said exterior circumferential groove in said sleeve member and rockable about a pivot axis through said trunions.

11. A shift mechanism and clutch apparatus comprising:
a main axial shaft;
a reverse gear freely rotatable about said main shaft, said reverse gear having a clutch face on one side;
a forward gear freely rotatable about said main shaft, said forward gear having a clutch face on one side, with said clutch faces facing each other;
a drive gear meshed with said reverse and forward gears for driving said reverse and forward gears in respectively opposite directions of rotation;
a sleeve member mounted on said main shaft between said reverse and forward gears, said sleeve member having
 a clutch face at each end, each clutch face selectively engageable with one of said clutch faces of said reverse and forward gears, and
 an exterior circumferential groove in said sleeve member between said clutch faces;
first and second annular rings around facing circumferential edges of respective said reverse and forward gears, each said ring lying in a respective circumferential plane about said main axial shaft and each having an eccentric face surface in its respective said plane;
shift means for selectively moving said sleeve member axially along said main shaft to a reverse or forward drive position to engage one of said sleeve clutch faces with one of said reverse or forward gear clutch faces, comprising
 yoke means engaging said groove, cam means operatively associated with said yoke means,
 means for actuating said cam means into engagement with said eccentric face surface of said first ring to actuate said yoke means and drive said sleeve member out of engagement with said reverse gear and into engagement with said forward gear with a pulsed impact hammer effect due to said eccentricity of said face surface of said first ring as it rotates in said circumferential plane about said main shaft, and for actuating said cam means into engagement with said eccentric face surface of said second ring to actuate said yoke means and drive said sleeve member out of engagement with said forward gear and into engagement with said reverse gear with a pulsed impact hammer effect due to said eccentricity of said face surface of said second ring as it rotates in said circumferential plane about said main shaft.

12. The invention according to claim 11 wherein each of said eccentric face surfaces of said rings has a maximum height portion 180° offset from a minimum height portion to provide one impact on said cam means per revolution of the respective said gear.

13. The invention according to claim 11 wherein:
said cam means comprises first and second cams on opposite sides of said yoke means, said first cam facing said reverse gear and said first ring, and said second cam facing said forward gear and said second ring;
said actuating means comprises means for rotating said first and second cams relative to said yoke means about an axis parallel to said main shaft, said actuating means having a central neutral position and forward and reverse rotated positions on opposite sides of said neutral position;
said first cam has a tapered arcuate camming surface having a reduced height portion axially aligned with and spaced from said first ring when said actuating means is in said neutral position, and having an increased height portion axially aligned with and engaging said first ring when said actuating means is rotated to said forward position such that engagement of said first cam with said first ring drives said yoke means axially away from said reverse gear and toward said forward gear to drive said sleeve member out of engagement with said reverse gear and into engagement with said forward gear;
said second cam has a tapered arcuate camming surface having a reduce height portion axially aligned with and spaced from said second ring when said actuating means is in said neutral position, and having an increased height portion axially aligned with and engaging said second ring when said actuating means is rotated to said reverse position such that engagement of said second cam with said second ring drives said yoke means axially away from said reverse gear and toward said forward gear to drive said sleeve member out of engagement with said reverse gear and into engagement with said forward gear.

14. The invention according to claim 11 wherein said yoke means comprises a split fork with spaced tines, and comprising a pair of trunions mounted on respective said tines, and a U-shaped insert mounted on said trunions between said tines and engaging said groove and rockable about a pivot axis through said trunions.

15. A shift mechanism and clutch apparatus comprising:
a main axial shaft;
reverse gear means freely rotatable about said main shaft, said reverse gear means having a clutch face on one side;
forward gear means freely rotatable about said main shaft, said forward gear means having a clutch face on one side, with said clutch faces facing each other;
a drive gear meshed with said reverse and forward gear means for driving said reverse and forward gear means in respectively opposite directions of rotation;
a sleeve member mounted on said main shaft between said reverse and forward gear means, said sleeve member having
 a clutch face at each end, each clutch face selectively engageable with one of said clutch faces of said reverse and forward gear means, and
 an exterior circumferential groove in said sleeve member between said clutch faces;

shift means for selectively moving said sleeve member axially along said shaft to a forward or reverse drive position to engage one of said sleeve clutch faces with one of said reverse or forward gear means clutch faces, comprising yoke means engaging said groove, first and second cams on opposite sides of said yoke means, means for actuating said first cam into engagement with said reverse gear means to actuate said yoke means and drive said sleeve member out of engagement with said reverse gear means and into engagement with said forward gear means, and for actuating said second cam into engagement with said forward gear means to actuate said yoke means and drive said sleeve member out of engagement with said forward gear means and into engagement with said reverse gear means, such that torque applied through said gear means assists clutch disengagement such that requisite shift force decreases as torque increases.

16. The invention according to claim 15 wherein: said reverse gear means comprises:

a reverse gear having said clutch face engageable with the respective said sleeve member clutch face; and an annular ring around a circumferential edge of said reverse gear facing and engageable with said first cam; and said forward gear means comprises:

a forward gear having said clutch face engageable with the respective said sleeve member clutch face; and an annular ring around a circumferential edge of said forward gear facing and engageable with said second cam.

17. The invention according to claim 16 wherein:

said first and second mentioned annular rings each lie in a respective circumferential plane about said main axial shaft and each has an eccentric face surface in its respective said plane;

said actuating means has a forward position actuating said first cam into engagement with said eccentric face surface of said first ring to actuate said yoke means and drive said sleeve member out of engagement with said reverse gear with a pulsed impact hammer effect due to said eccentricity of said face surface of said first ring as it rotates in its said circumferential plane about said main shaft;

said actuating means has a reverse position actuating said second cam into engagement with said eccentric face surface of said second ring to actuate said yoke means and drive said sleeve member out of engagement with said forward gear with a pulsed impact hammer effect due to said eccentricity of said face surface of said second ring as it rotates in its said circumferential plane about said main shaft.

18. The invention according to claim 17 wherein said yoke means comprises a split fork having a pair of spaced tines, and comprising a pair of trunions mounted on respective said tines, and an insert mounted on said trunions between said tines and engaging said groove and rockable about a pivot axis through said trunions.

* * * * *